Patented Oct. 14, 1941

2,259,350

UNITED STATES PATENT OFFICE 2,259,350

LATEX AND SHELLAC COATING

James A. Merrill, Barberton, Ohio, assignor to Wingfoot Corporation, Wilmington, Del., a corporation of Delaware No Drawing. Application March 30, 1940, Serial No. 327,049

7 Claims. (Cl. 91—68)

This invention relates to a latex and shellac coating for metals, etc. which may be coated with rubber.

According to this invention the metal or other base, such as wood, concrete or the like is coated with a mixture of latex and an alkaline salt of shellac and then covered with a latex coating. The whole may be vulcanized. It may be pigmented and contain fillers, etc. to give a coating of desired properties.

Considerable difficulty has been experienced in attempting to coat metals, etc. with rubber. Latex alone does not form a good bond with steel, etc. nor is the bond formed with wood, concrete, etc. altogether satisfactory. According to this invention, such difficulties are overcome by mixing shellac with the latex and where a latex surface is desired, the latex-shellac composition first applied is later coated with latex containing no shellac. The invention will be further described in connection with the coating of steel which is a preferred form of the invention.

A sheet of steel is first cleaned to remove dirt, grease, and rust spots, etc. It is then first coated with a latex-shellac composition and eventually with latex containing no shellac. Intermediate layers of latex containing shellac may be applied, the amount of shellac being less with each layer applied. The latex is applied by spraying or dipping, or in any other suitable manner.

The following procedure is illustrative of the invention:

Shellac is brought into solution in water by soaking, preferably in hot water, and adding ammonia or other alkaline material with stirring unitl a clear solution results. The amount of shellac present may vary to a considerable degree; for example, it may be as low as twenty per cent or as high as eighty or ninety per cent or somewhat higher. All percentages referred to herein are based on the total weight of the shellac (not the alkaline salt) and the rubber present in the latex suspension. Mixtures containing twenty, forty, sixty, and eighty per cent of rubber have proven satisfactory.

A cleaned sheet of steel was first sprayed with a mixture of the alkaline salt of shellac and latex containing twenty per cent of rubber. It was then sprayed with a mixture containing forty per cent of rubber and then with a mixture containing eighty per cent of rubber. Two coats of latex containing no shellac were then sprayed onto the latex-shellac base. The whole was then dried. The resulting coating on the metal was about 1/16 of an inch thick and was securely bonded to it. Typical coatings for such a process are:

| | Wet weight | Dry weight |
|---|---|---|
| | Parts | Parts |
| First coating: | | |
| 60% latex | 33.3 | 20 |
| 20% shellac | 400 | 80 |
| Second coating: | | |
| 60% latex | 67 | 40 |
| 20% shellac | 300 | 60 |
| Third coating: | | |
| 60% latex | 133 | 80 |
| 20% shellac | 100 | 20 |
| Fourth coating: | | |
| 60% latex | 167 | 100.0 |
| 50% ZnO | 4.0 | 2.0 |
| 50% sulfur | 2.0 | 1.0 |
| 40% accelerator | 2.5 | 1.0 |

Although the above example refers specifically to the coating of steel, other metals such as aluminum, tin, lead, etc. may be coated similarly.

I claim:

1. Metal with an adjacent coating comprising a mixture of rubber from latex and an alkaline salt of shellac, and an outer coating of rubber from latex which is free from shellac.

2. Steel with an adjacent coating comprising a mixture of rubber from latex and the sodium salt of shellac and an outside coating of rubber from latex which is free from shellac.

3. The method of coating steel which comprises applying thereto at least one layer of latex admixed with an alkaline salt of shellac and then coating the resulting product with latex and then drying all the coatings.

4. The method of coating steel which comprises applying thereto an admixture of latex and an alkaline salt of shellac, then applying an admixture of latex and an alkaline salt of shellac which contains a smaller proportion of shellac than the first mentioned coating, and thereafter applying a vulcanizable latex composition.

5. Metal with an adjacent coating comprising a mixture of rubber from latex and an alkaline salt of shellac and an outer coating of rubber from latex and an intermediate coating comprising a mixture of rubber from latex and an alkaline salt of shellac, the shellac in said last mentioned coating being present in smaller amount than in the coating next to the metal.

6. Steel with an adjacent coating comprising a mixture of rubber from latex and an alkaline salt of shellac and an outer coating of vulcanized rubber from latex.

7. Steel coated with two layers of rubber deposited from latex, the layer adjacent the steel containing more shellac than the other.

JAMES A. MERRILL.